US010733541B2

(12) United States Patent
Crawford et al.

(10) Patent No.: US 10,733,541 B2
(45) Date of Patent: *Aug. 4, 2020

(54) SYSTEM, METHOD, AND RECORDING MEDIUM FOR GEOLOCATION DATA DISCOVERY IN STREAMING TEXTS

(71) Applicant: International Business Machines Corporation, Armonk, NY (US)

(72) Inventors: Catherine Helen Crawford, Carmel, NY (US); John Andrew Gunnels, Yorktown Heights, NY (US); Grzegorz Michal Swirszcz, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/547,954

(22) Filed: Aug. 22, 2019

(65) Prior Publication Data
US 2019/0378045 A1 Dec. 12, 2019

Related U.S. Application Data

(63) Continuation of application No. 15/189,736, filed on Jun. 22, 2016, now Pat. No. 10,504,041.

(51) Int. Cl.
*G06N 20/00* (2019.01)
*H04W 4/02* (2018.01)
(Continued)

(52) U.S. Cl.
CPC .......... *G06N 20/00* (2019.01); *G06F 40/279* (2020.01); *G06F 40/30* (2020.01); *G06F 40/47* (2020.01);
(Continued)

(58) Field of Classification Search
CPC .......... H04W 4/14; H04W 4/90; H04W 4/02; H04W 4/023; H04W 4/029; H04L 51/32
See application file for complete search history.

(56) References Cited

U.S. PATENT DOCUMENTS 7,599,988 B2    10/2009  Frank
8,897,807 B2    11/2014  Patel et al.
(Continued)

OTHER PUBLICATIONS

United States Notice of Allowance dated Aug. 5, 2019, in U.S. Appl. No. 15/189,736.
(Continued)

*Primary Examiner* — Mirza F Alam
(74) *Attorney, Agent, or Firm* — Kevin Michael Jordan, Esq.; McGinn IP Law Group, PLLC

(57) ABSTRACT

A geolocation data discovery method, system, and non-transitory computer readable medium, include mining a textual alert message of an event from secure source data for a geolocational indicator, a temporal indicator, and a type of alert, embedding a geolocational tag location and a temporal tag time to the event based on the geolocational indicator and the temporal indicator mined from the textual alert message by the secure text mining, mapping the event with an icon related to the type of alert at the geolocational tag location on a navigational map at a time associated with the temporal tag time of the event, learning a false-positive event by comparing a secure sensor with an unsecure sensor as the secure source data, and removing updates to the icon on the map based on the learned false-positive event.

8 Claims, 5 Drawing Sheets

(51) Int. Cl.
  *H04W 4/12* (2009.01)
  *G06N 5/04* (2006.01)
  *H04W 4/029* (2018.01)
  *H04W 4/90* (2018.01)
  *G06F 40/30* (2020.01)
  *G06F 40/47* (2020.01)
  *G06F 40/58* (2020.01)
  *G06F 40/279* (2020.01)

(52) U.S. Cl.
  CPC .............. *G06F 40/58* (2020.01); *G06N 5/04* (2013.01); *H04W 4/023* (2013.01); *H04W 4/029* (2018.02); *H04W 4/12* (2013.01); *H04W 4/90* (2018.02)

(56) References Cited

U.S. PATENT DOCUMENTS

| | | | |
|---|---|---|---|
| 9,301,117 B2 | 3/2016 | Leggett et al. | |
| 2005/0261012 A1* | 11/2005 | Weiser | H04L 12/1895 455/466 |
| 2010/0075628 A1* | 3/2010 | Ye | H04W 4/90 455/404.2 |
| 2011/0131045 A1* | 6/2011 | Cristo | G06F 17/279 704/249 |
| 2012/0005285 A1* | 1/2012 | Lin | H04W 4/90 709/206 |
| 2014/0368601 A1* | 12/2014 | deCharms | H04W 4/021 348/14.02 |
| 2015/0056946 A1* | 2/2015 | Leggett | H04W 4/02 455/404.2 |
| 2017/0325056 A1* | 11/2017 | Mehta | H04W 4/90 |

OTHER PUBLICATIONS

United States Office Action dated Jun. 13, 2019, U.S. Appl. No. 15/189,736.
United States Office Action dated Apr. 8, 2019, U.S. Appl. No. 15/189,736.
Mel, et al. "The NIST Definition of Cloud Computing". Recommendations of the National Institute of Standards and Technology. Nov. 16, 2015.

\* cited by examiner

SYSTEM, METHOD, AND RECORDING MEDIUM FOR GEOLOCATION DATA DISCOVERY IN STREAMING TEXTS

CROSS-REFERENCE TO RELATED APPLICATIONS

The present application is a Continuation Application of U.S. patent application Ser. No. 15/189,736, filed on Jun. 22, 2016, the entire contents of which are hereby incorporated by reference.

BACKGROUND

The present invention relates generally to a geolocation data discovery system, and more particularly, but not by way of limitation, to a system using data streams of trusted sources already in existence to collect geolocation data and time to plot events.

Spatiotemporal data and correlation of that data with events are important components of fleet management systems, e.g. traffic and/or road condition avoidance, public safety alerts. Such event and alert data is conventionally sent using social media streams such as Twitter® and Nixle®. These alerts and messages often times contain location data, but in textual form for human consumption, e.g. "@NHDOT TRAFFIC ALERT: Emergency road construction between exits 7W and 6 on Southbound Everett Turnpike". The alert message contains location data associated with the server that is distributing the alert, but not location data associated with the geolocation of the event. Thus, the conventional fleet management systems cannot be synced with navigational services (e.g., the location of the events cannot be mapped onto the navigational maps) because the locational data of the alert is at a centralized server location and not at the location of the alert.

Conventional navigational systems attempt to leverage real-time data to predict the most efficient route (e.g., estimate a state of traffic, delays, accidents, etc.). However, the conventional approaches rely on user inputs (such as a feedback or data drawn from a device) such that the system could be manipulated to output false statements because the data is being processed from untrusted sources. For example, if user inputs or a computer algorithm generating user inputs are enough to flood a system with an accident report in a particular location, the conventional navigation systems will display to users that there is traffic in the area even if there is actually no traffic. Alternatively, the system can be flooded with reports of no traffic in an area with heavy traffic to manipulate navigational systems to guide the users on this path that can potentially contain a high traffic state. This can create security concerns by enabling users to create traffic in predetermined locations.

That is, there is a technical problem in the conventional techniques in that the conventional fleet management techniques manage the system based on either event data from unsecure user inputs and feedback such that the event data can be manipulated to create a false positive of traffic, or allow users to intelligently change a route based on received messages from a central location from a secure input such as government alerts such that it requires intelligent interaction with the navigational system by a user outside of the system capabilities. In other words, there is a technical problem in the conventional techniques that unsecure sources can manipulate data of a fleet management system for a desired outcome that can potentially create risks to society (e.g., creating a traffic situation to prevent emergency services from arriving at a location, etc.).

SUMMARY

In view of the technical problem, the inventors have considered a non-abstract improvement to a computer technology via a technical solution to the technical problem in which a system can mine textual alert outputs from a secure trusted source for geolocation indicators (e.g., street intersections, mile marker, exit number on interstate, etc.) about an event (e.g., an accident, construction, road closing, etc.) and embed the alert outputs from the secure trusted source with the geolocation and a temporal tag such that the event can be mapped in a navigational service.

In an exemplary embodiment, the present invention can provide a geolocation data discovery system, including a secure text mining circuit configured to mine a textual alert message of an event from secure source data for a geolocational indicator, a temporal indicator, and a type of alert, a geolocation and temporal embedding circuit configured to embed a geolocational tag location and a temporal tag time to the event based on the geolocational indicator and the temporal indicator mined from the textual alert message by the secure text mining circuit, and an event mapping circuit configured to map the event with an icon related to the type of alert at the geolocational tag location on a navigational map at a time associated with the temporal tag time of the event.

Further, in another exemplary embodiment, the present invention can provide a geolocation data discovery method, including mining a textual alert message of an event from secure source data for a geolocational indicator, a temporal indicator, and a type of alert, embedding a geolocational tag location and a temporal tag time to the event based on the geolocational indicator and the temporal indicator mined from the textual alert message by the mining, and mapping the event with an icon related to the type of alert at the geolocational tag location on a navigational map at a time associated with the temporal tag time of the event.

Even further, in another exemplary embodiment, the present invention can provide a non-transitory computer-readable recording medium recording a geolocation data discovery program, the program causing a computer to perform: mining a textual alert message of an event from secure source data for a geolocational indicator, a temporal indicator, and a type of alert, embedding a geolocational tag location and a temporal tag time to the event based on the geolocational indicator and the temporal indicator mined from the textual alert message by the mining, and mapping the event with an icon related to the type of alert at the geolocational tag location on a navigational map at a time associated with the temporal tag time of the event.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
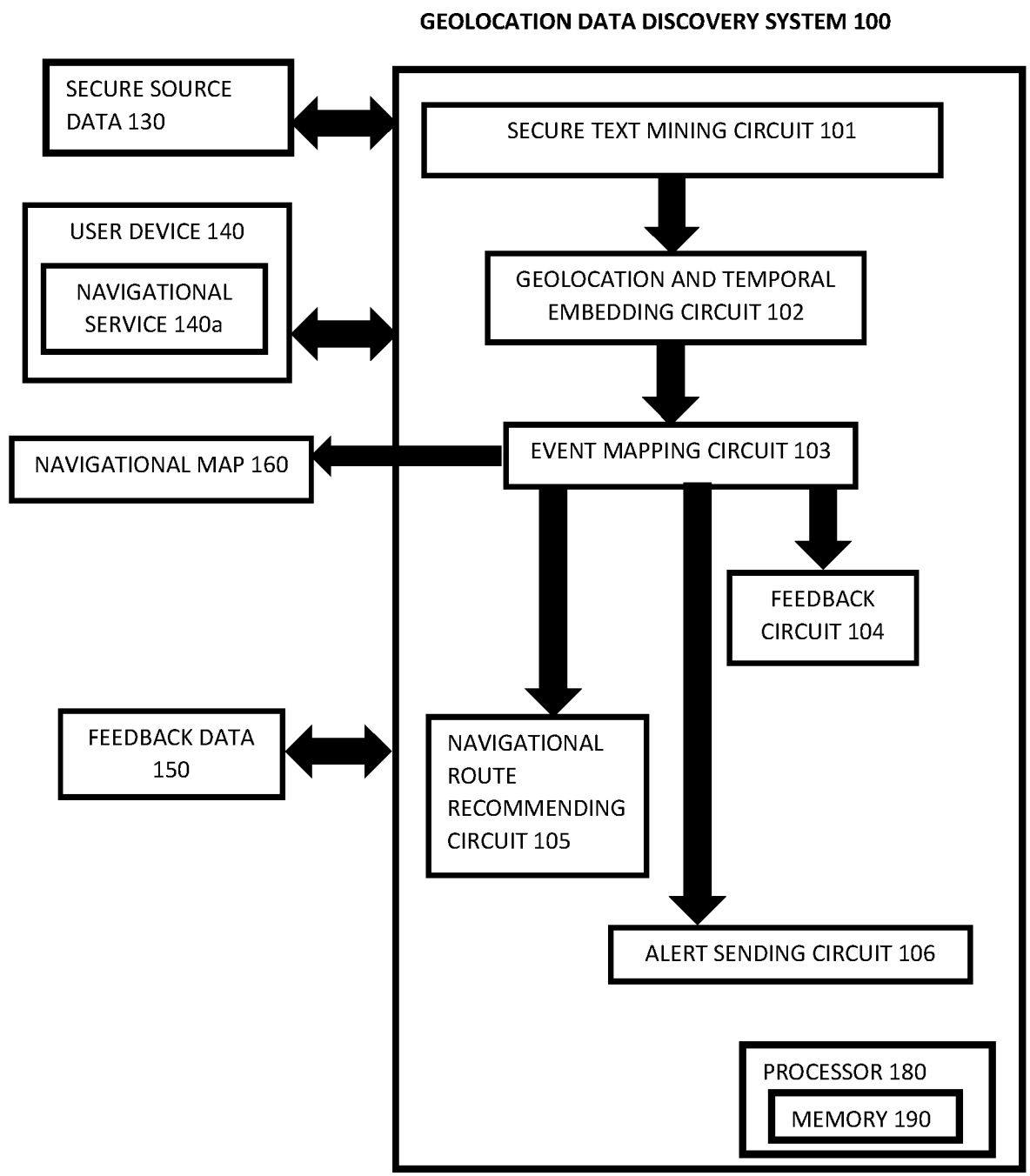
FIG. 1 exemplarily shows a block diagram illustrating a configuration of a geolocation data discovery system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the geolocation data discovery system 100 includes secure text mining circuit 101, a geolocation and temporal embedding circuit 102, an event mapping circuit 103, a feedback circuit 104, a navigational route recommending circuit 105, and an alert sending circuit 106. The geolocation data discovery system 100 includes a processor 180 and a memory 190, with the memory 190 storing instructions to cause the processor 180 to execute each circuit of the geolocation data discovery system 100. The processor and memory may be physical hardware components, or a combination of hardware and software components.

Although the geolocation data discovery system 100 includes various circuits, it should be noted that a geolocation data discovery system can include modules in which the memory 190 stores instructions to cause the processor 180 to execute each module of the geolocation data discovery system 100.

Also, each circuit can be a stand-alone device, unit, module, etc. that can be interconnected to cooperatively produce a transformation to a result.

With the use of these various circuits, the geolocation data discovery system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 3:
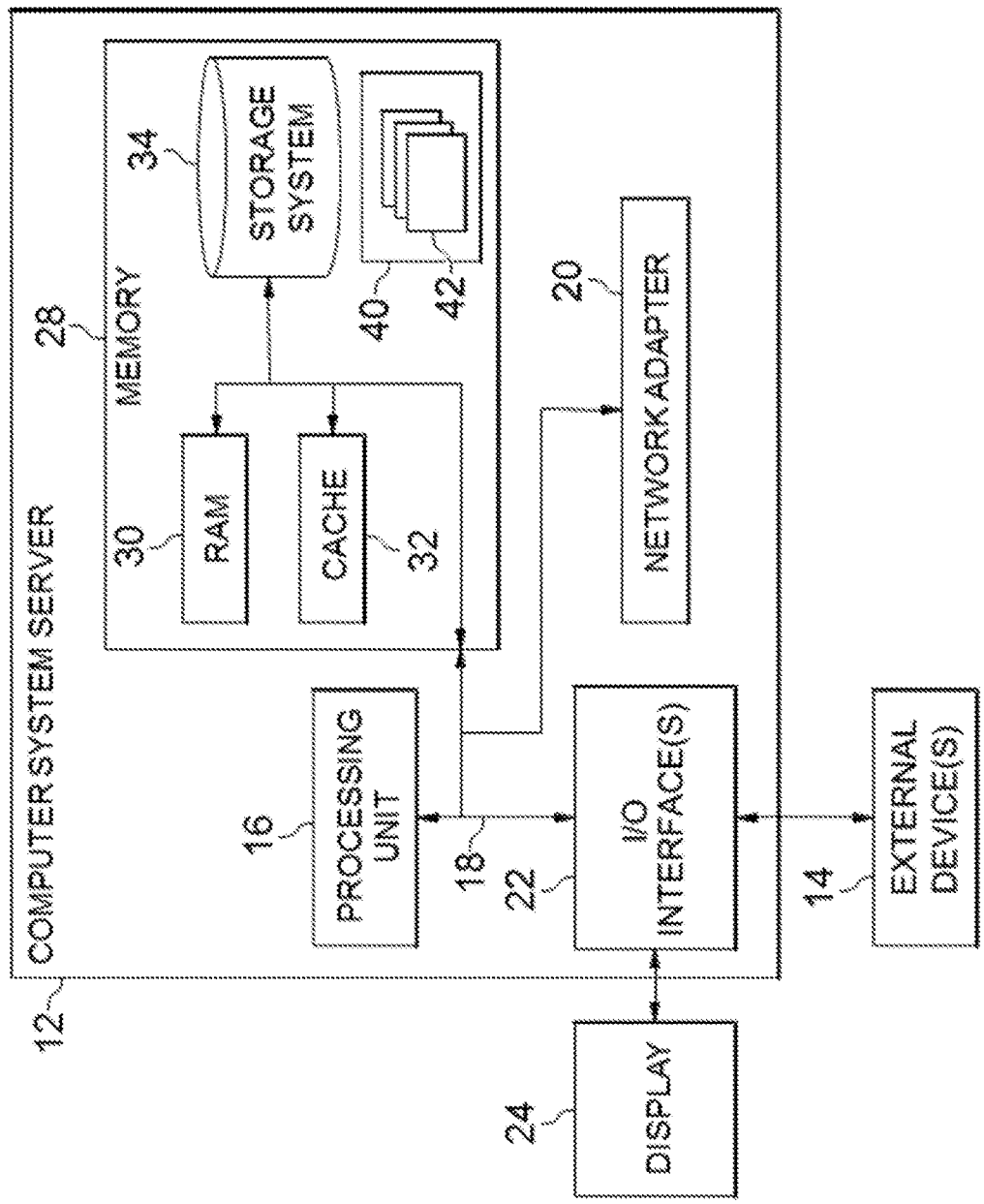
FIG. 3 depicts a cloud computing node 10 according to an exemplary embodiment of the present invention.
Figure 4:
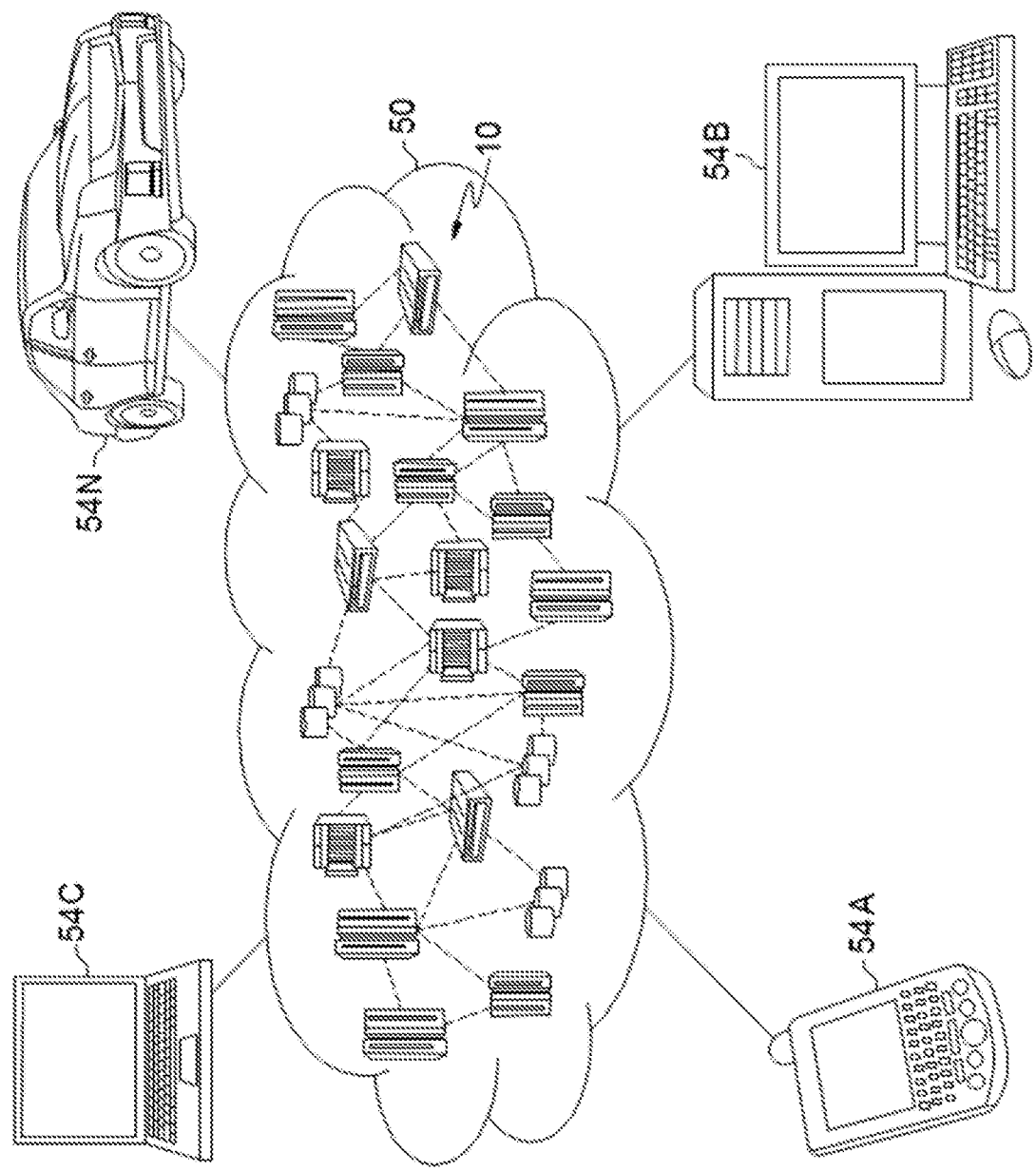
FIG. 4 depicts a cloud computing environment 50 according to another exemplary embodiment of the present invention.
Figure 5:
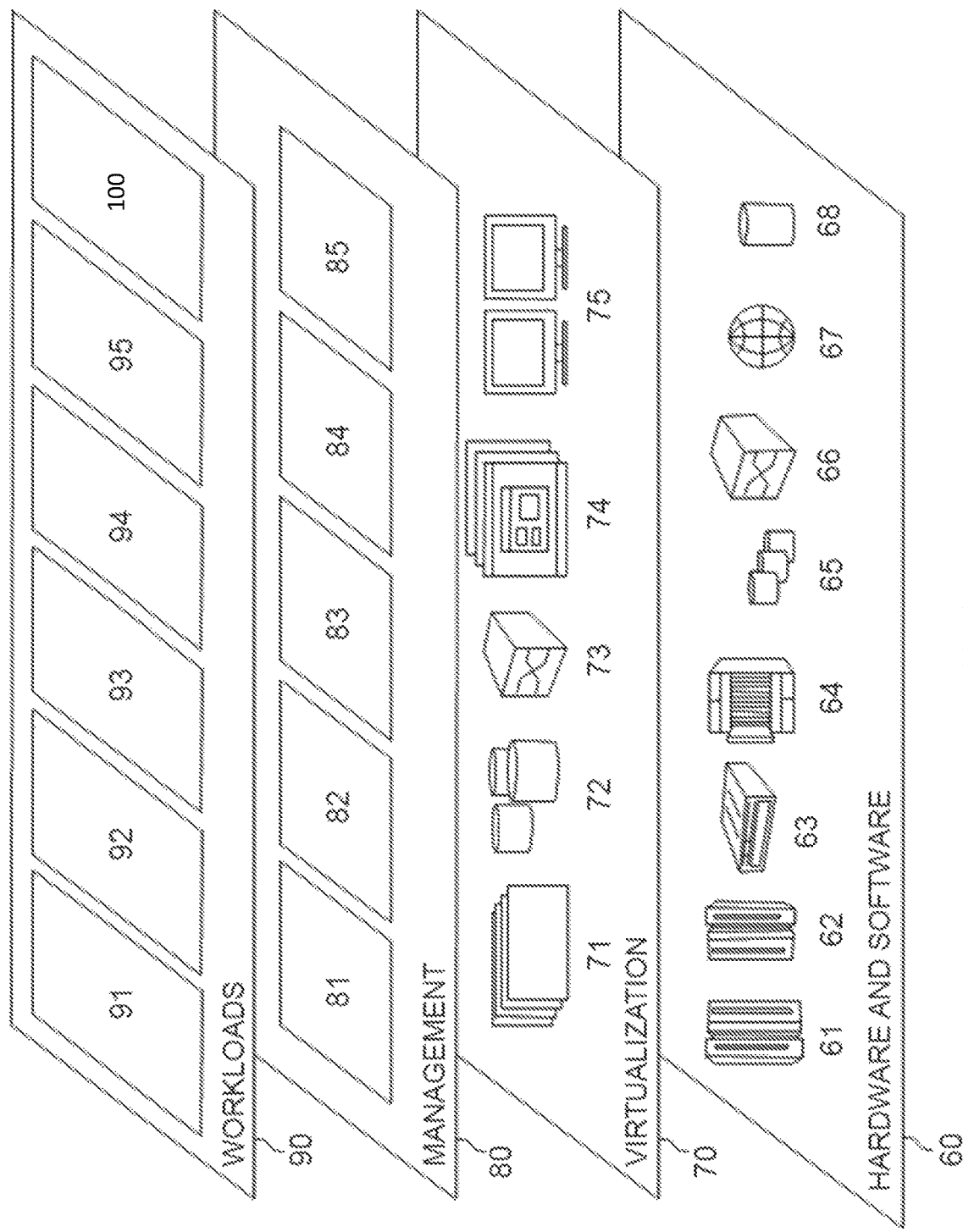
FIG. 5 depicts abstraction model layers according to an exemplary embodiment of the present invention.

Although as shown in FIGS. 3-5 and as described later, the computer system/server 12 is exemplarily shown in cloud computing node 10 as a general-purpose computing circuit which may execute in a layer the geolocation data discovery system 100 (FIG. 5), it is noted that the present invention can be implemented outside of the cloud environment.

The secure source data 130 includes textual alert messages generated via Twitter®, Nixle®, e-mail, and other social media used by secure trusted sources (e.g., official public safety organizations for traffic, road condition and maintenance alerts). For example, an alert message can recite "accident at intersection of Maple Street and Kennedy Drive" or "construction on Jefferson Bridge between 12 A.M. and 5 A.M.".

The secure text mining circuit 101 receives the textual alert messages for an event from the secure source data 130 and mines the textual alert messages for geolocational indicators and a type of alert. For example, the term "accident" would be mined by the secure text mining circuit 101 to indicate that there may be a traffic incident. The terms "Maple Street and Kennedy Drive" would be the geolocational indicators of the textual alert message. That is, the secure text mining circuit 101 using natural language processing techniques to mine the textual alert messages for the type of alert associated with different words such as a "crash", "accident", "collision", "pile-up", "traffic jam", "back-up" etc. and then links the geolocational indicator with the type of alert.

Also, the secure text mining circuit 101 mines the textual alert message for a temporal element indicating a time of the event. For example, although the accident may be recorded at the time the textual alert message was sent, the "construction on Jefferson Bridge between 12 A.M. and 5 A.M." is mined for the specific time of the event to occur.

Based on the geolocational indicator mined from the alert textual messages by the secure text mining circuit 101, the geolocation and temporal embedding circuit 102 embeds the textual alert message with geolocation data matching the location of the alert (e.g., the global positioning coordinates of Maple Street and Kennedy Drive) and embeds a temporal element (e.g., the time that the textual element was sent or a time indicated in the textual element) with the alert message.

Based on the embedded geolocation data and the temporal data and the type of event identified, the event mapping circuit 103 maps the event on a navigational map 160 in the location corresponding to the geolocation data and at a time corresponding to the temporal data. For example, the event mapping circuit 103 would immediately display an accident on the map at the location of Maple Street and Kennedy Drive but may not display the construction on the Jefferson Bridge until 12 A.M. (or at a time within a threshold from the beginning of the construction). Preferably, the event mapping circuit 103 uses an icon related to the type of event (e.g., a construction icon, accident icon, etc.) to show the event on the navigational map 160.

The feedback circuit 104 receives feedback data 150 from sensors displayed in a location that can view the event such as traffic cameras, security cameras, etc., from imaging devices on a secure trusted vehicle (e.g., such as government vehicles), from messages sent to the system from a secure trusted user (e.g., such as a user having a ".gov" e-mail), etc.

Based on the feedback from the secure trusted sources, the feedback circuit 104 updates the navigational map 160. For example, if a traffic camera detects that the accident has been cleared, the feedback circuit 104 can cause the event mapping circuit 103 to remove the event. Or, if a government vehicle is at the construction site and the construction ends at 3 A.M. instead of 5 A.M., images from the government vehicle fed into the feedback circuit 104 which are analyzed to determine that the construction is over and the event can be removed from the navigational map 160.

Also, the feedback circuit 104 can receive feedback data 150 related to an event and determine if the event was mapped. For example, if a traffic camera detects an accident at mile marker seven on the interstate and the event mapping circuit 103 did not map the event, the feedback circuit 104 causes the secure text mining circuit 101 to mine the secure source data 130 to look for a textual alert message related to mile marker seven. If the secure text mining circuit 101 finds a textual alert message reciting "large pile-up at mile marker seven", the feedback circuit 104 causes the secure text mining circuit 101 to learn that "pile-up" can mean accident and the event should have been sent to the geolocation and temporal embedding circuit 102 to embed the geolocation data and temporal data with the message. In this manner, the feedback circuit 104 can cause the natural language processing of the securing text mining circuit 101 to "learn" over time, thereby to increase the accuracy of the system 100.

It is noted that the feedback circuit 104 can act in a cognitive manner such that the feedback circuit 104 can also learn false positives and not update the event mapping circuit 103 in the future based on the learning. For example, if particular secure vehicle cameras generate images at night that give an illusion of a street being clear but the secure trusted vehicle cameras cannot generate night time images and the street is actually not clear, the feedback circuit 104 learns this feedback and does not update the navigational map 160 based on this type of input in the future.

Thus, the feedback circuit 104 receives feedback data 150 from a secure trusted source to modify the navigational map 160 or learn new modifications based on past generated navigational map 160s to optimize the system 100. For example, the feedback circuit 104 receives the feedback data 150 from a secured trusted source (i.e., a government vehicle, government e-mail address, verified user, etc.) and causes the event mapping circuit 103 to update a status of the event (e.g., more traffic, accident over, construction finished, etc.) on the navigational map 160 based on the received feedback data 150.

The navigational route recommending circuit 105 interfaces with a user device 140 including a navigational service 140a and recommends a navigational route to the user based on avoiding the events mapped on the navigational map 160 by the event mapping circuit 103. That is, the navigation route recommending circuit 105 matches the temporal data embedded in the navigational map with a current time (or predicted time to be at that location) from the current user location to determine how to avoid events.

In one embodiment, the entire geolocation data discovery system 100 can be installed on the user device 140 as an "application" which can be customized by the user. For example, the application on the user device includes access to the secure source data 130 (using GPS tags used in social media, for example) which the application dynamically subscribes to or unsubscribes from based on a geolocational position of the user. That is, the application can use GPS locations on the user device 140 to subscribe to specific GPS tagged secure source data 130 (e.g. Department of Transportation for a location, a local town construction service, etc.) instead of from a general provider of data (e.g., an unsecure provider), and a GPS tag may be for a large area outside of driving range (e.g. whole state, county, etc.). Text from feeds of the subscribed to secure source data 130 are analyzed by the secure text mining circuit 101 to determine events within an adjustable radius of the user location or on the programmed route on the navigational service 140a. In other words, the secure text mining circuit 101 only mines secure source data 130 for the subscribed to streams, the geolocation and temporal embedding circuit 102 embeds the geolocation data and temporal data with the event, and the event mapping circuit 103 only displays the events to the user if the events are within the adjustable radius of the user or on the programmed route.

The application enables the driver to dismiss events or correct an event (e.g. it is not a traffic event and the secure text mining circuit 101 read the text incorrectly). A scoring algorithm on the device makes adjustments locally and also provides feedback on corrections to back end server for model updates. Analytics can also learn the driver behavior of what type of events are always (or often) dismissed to reduce event generation. None of the driver behavior is sent to a cloud computing node and instead the computations are done locally on the user device 140. As vehicle travels on route, new subscriptions are generated for new feeds, others unsubscribed to, etc. to continuously update the navigational map 160.

Also, the feedback circuit 104 can receive GPS data from a government vehicle traveling in a region near the reporting event such that the feedback circuit 104 can help predict a delay associated with the event mapped on the navigational map 160. Therefore, the navigational route recommending circuit 105 can predict delay times in a trusted manner from secure sources such as the government vehicles traveling in the area of the event.

Thereby, the application can allow, for example, based on the location of the user device 140, a set of social media feeds to be selected to be sent to the device for real time analysis. Users can limit the feeds so as to limit the data transferred. The textual data is analyzed and location, temporal data, and event type are determined and displayed in the application on the navigational map 160. Users can mark the event as "false recognition" when received and this data can be sent back to a centralized data center so as to improve the model. As the location of the user device 140 changes, the social media feeds (e.g., the secure source data 130) change automatically based on location. By shutting down some feeds (no longer subscribing) and only subscribing to feeds that are for specific states, counties, etc. this reduces the amount of data required to be transferred. The application can detect feeds that have become largely redundant with the same information and automatically turns off one of the subscriptions producing the redundant information (e.g. same information coming from a fire department and police department). It is noted that pushing the analytics to the user device 140 leverages battery power and potentially electric charge from the vehicle, rather than the electricity in a data center. The user can specify to only show traffic events on a designated route and with a likelihood that the driver will encounter the event based on their travel (e.g. how far a car is traveling when will it arrive at accident). This can also reduce the amount of data that needs to be transmitted.

The alert sending circuit 106 sends a text message, e-mail, alert notification, a "GeoSMS" message, etc. to the user device 140 of the event when the user device 140 is within a predetermined distance of the event Thereby, if the user is a pedestrian or not currently traveling, the user can still receive alerts based on their location being near the location of an incident without having to view the navigational map 160.

Figure 2:
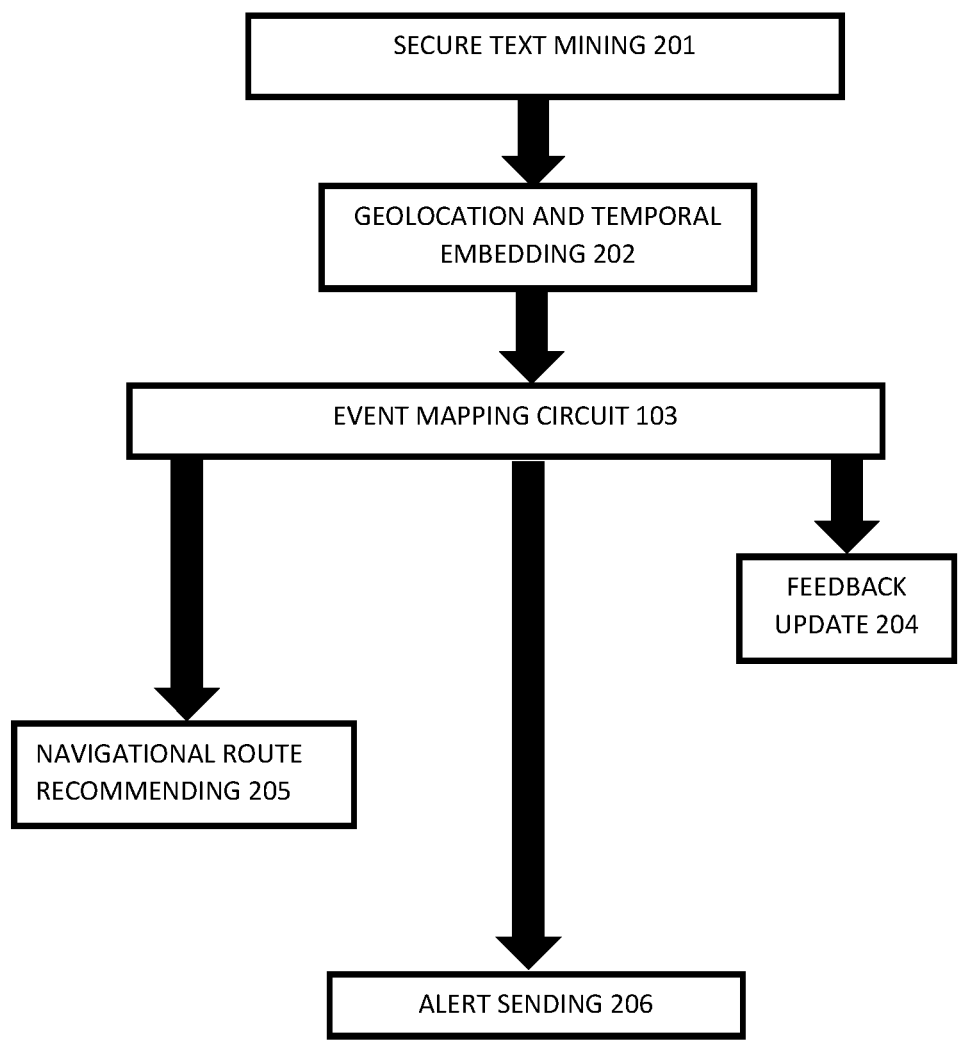
FIG. 2 exemplarily shows a high level flow chart for a geolocation data discovery method 200.

FIG. 2 shows a high level flow chart for a method 200 of geolocation data discovery.

Step 201 receives a textual alert message for an event from the secure source data 130 and mines the textual alert message for geolocational and temporal indicators and a type of alert.

Based on the geolocational indicator mined from the alert textual message by Step 201, Step 202 embeds the textual alert message with the geolocation data matching the location of the alert (e.g., the global positioning coordinates) and embeds a temporal element (e.g., the time that the textual element was sent or a time indicated in the textual element) with the alert message.

Step 203 maps the event on a navigational map 160 in a location corresponding to the geolocation data and at a time corresponding to the temporal data.

Step 204 receives feedback data 150 from sensors displayed in a location that can view the event such as traffic cameras, security cameras, etc., from imaging devices on secure trusted vehicle (e.g., such as government vehicles), from messages sent to the system from a secure trusted user (e.g., such as a user having a ".gov" e-mail), etc. Based on the feedback from the secure sources, Step 204 updates the events of the navigational map 160.

Step 205 recommends a navigational route to the user based on avoiding the events mapped on the navigational map 160 by Step 203 via interfacing with a navigational service 140a on a user device 140.

Step 206 sends a text message, e-mail, alert notification, a "GeoSMS" message, etc. to the user device 140 of the event when the user device 140 is within a predetermined distance of the event. Thereby, if the user is a pedestrian or not currently traveling, the user can still receive alerts based on their location being near the location of an incident without having to view the navigational map 160.

Therefore, by mining events from textual alert messages in secure source data 130 (e.g., trusted providers of data such as a government entity) and associating geolocation data and temporal data with the textual alert message, the events mapped on the navigational map 160 can be trusted to be accurate and secure from manipulation. In other words, the events mapped on the navigational map 160 are entirely generated based on secure source data 130 such that users cannot manipulate source data to create (or prevent) traffic or congestion.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the geolocation data discovery system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A geolocation data discovery system, comprising:
a processor; and
a memory, the memory storing instructions to cause the processor to perform:
  mining a textual alert message of an event from secure source data for a geolocational indicator, a temporal indicator, and a type of alert, a source of the secure source data being selectively chosen;
  embedding a geolocational tag location and a temporal tag time to the event based on the geolocational indicator and the temporal indicator mined from the textual alert message by the secure text mining;
  mapping the event with an icon related to the type of alert at the geolocational tag location on a navigational map at a time associated with the temporal tag time of the event;
  learning a false-positive event by analyzing an input to a secure sensor with a feedback provided from an unsecure source using an application that receives the icon; and
  removing updates to the icon on the map based on the learned false-positive event,
wherein the feedback includes an error code from a verified user indicating that the mapping excluded a particular event, and
wherein the error code is learnt to adapt a natural language processing algorithm to avoid causing the error code for a future textual alert message.

2. A geolocation data discovery method, comprising:
mining a textual alert message of an event from secure source data for a geolocational indicator, a temporal indicator, and a type of alert, a source of the secure source data being selectively chosen;
embedding a geolocational tag location and a temporal tag time to the event based on the geolocational indicator and the temporal indicator mined from the textual alert message by the secure text mining;
mapping the event with an icon related to the type of alert at the geolocational tag location on a navigational map at a time associated with the temporal tag time of the event;
learning a false-positive event by analyzing an input to a secure sensor with a feedback provided from an unsecure source using an application that receives the icon; and
removing updates to the icon on the map based on the learned false-positive event,
wherein the feedback includes an error code from a verified user indicating that the mapping excluded a particular event, and
wherein the error code is learnt to adapt a natural language processing algorithm to avoid causing the error code for a future textual alert message.

3. A non-transitory computer-readable recording medium recording a geolocation data discovery program, the program causing a computer to perform:
  mining a textual alert message of an event from secure source data for a geolocational indicator, a temporal indicator, and a type of alert, a source of the secure source data being selectively chosen;
  embedding a geolocational tag location and a temporal tag time to the event based on the geolocational indicator and the temporal indicator mined from the textual alert message by the secure text mining;
  mapping the event with an icon related to the type of alert at the geolocational tag location on a navigational map at a time associated with the temporal tag time of the event;
  learning a false-positive event by analyzing an input to a secure sensor with a feedback provided from an unsecure source using an application that receives the icon; and
  removing updates to the icon on the map based on the learned false-positive event,
  wherein the feedback includes an error code from a verified user indicating that the mapping excluded a particular event, and
  wherein the error code is learnt to adapt a natural language processing algorithm to avoid causing the error code for a future textual alert message.

4. The method of claim 2, wherein the feedback is provided by the user via the application at a time difference than the textual alert message.

5. The method of claim 2, wherein the secure source of data comprises a social media stream of a trusted entity, the trusted entity comprising a government entity.

6. The system of claim 2, wherein the mapping maps the event at the time associated with the temporal tag time of the event based on a user being at the geolocational tag location of the event at the time.

7. The method of claim 2, wherein the feedback data comprises at least one of:
  an image from a verified source;
  an e-mail from a government e-mail address; and
  traffic camera data.

8. The method of claim 2, further comprising causing the mapping to update the status of the event by indicating whether the event is ongoing or is complete.

* * * * *